United States Patent
Nieuwenhuis

(10) Patent No.: US 8,196,202 B2
(45) Date of Patent: Jun. 5, 2012

(54) MOBILE NETWORK SECURITY SYSTEM

(75) Inventor: Taco Nieuwenhuis, Utrecht (NL)

(73) Assignee: Markport Limited, Dublin 2 (IE)

( * ) Notice: Subject to any disclaimer, the term of this patent is extended or adjusted under 35 U.S.C. 154(b) by 1279 days.

(21) Appl. No.: 11/794,822

(22) PCT Filed: Jan. 18, 2006

(86) PCT No.: PCT/IE2006/000002
§ 371 (c)(1),
(2), (4) Date: Jul. 6, 2007

(87) PCT Pub. No.: WO2006/077536
PCT Pub. Date: Jul. 27, 2006

(65) Prior Publication Data
US 2008/0092225 A1 Apr. 17, 2008

Related U.S. Application Data

(60) Provisional application No. 60/644,531, filed on Jan. 19, 2005.

(51) Int. Cl.
*G06F 11/00* (2006.01)
(52) U.S. Cl. .......................... 726/22; 726/13
(58) Field of Classification Search .............. 726/22–25, 726/11–13; 713/151–154, 188; 455/410, 455/411; 709/224, 225, 229
See application file for complete search history.

(56) References Cited

U.S. PATENT DOCUMENTS

| | | | |
|---|---|---|---|
| 6,101,393 A | 8/2000 | Alperovich et al. | 455/466 |
| 6,603,389 B1* | 8/2003 | Murray | 340/7.2 |
| 6,738,814 B1* | 5/2004 | Cox et al. | 709/225 |
| 6,885,872 B2* | 4/2005 | McCann et al. | 455/466 |
| 2002/0184362 A1* | 12/2002 | Banerjee et al. | 709/224 |
| 2003/0009698 A1 | 1/2003 | Lindeman et al. | 713/201 |
| 2003/0083078 A1 | 5/2003 | Allison et al. | 455/466 |
| 2005/0101306 A1* | 5/2005 | Zabawskyj et al. | 455/414.1 |
| 2006/0135133 A1* | 6/2006 | Cai et al. | 455/414.1 |
| 2007/0281718 A1* | 12/2007 | Nooren | 455/466 |
| 2008/0004047 A1* | 1/2008 | Hill et al. | 455/466 |

FOREIGN PATENT DOCUMENTS
GB 2397139 * 7/2003
WO WO 2005091656 * 3/2005
* cited by examiner Primary Examiner — Nirav B. Patel
(74) Attorney, Agent, or Firm — Jacobson Holman PLLC

(57) ABSTRACT

A security system for a mobile network (1) has a gateway (3) for receiving messages from outside the network and a HLR (10) storing mobile terminal location information. The security system monitors in real time messages entering the network through the gateway (3), and decides according to said monitoring if messages are likely to be unsolicited. The system may block messages which are likely to be unsolicited. The system monitors a source address of a look-up request and a source address of a corresponding message, and decides that the message is likely to be unsolicited if its source address is different from that of the corresponding look-up request. The system further comprises a data store (5) and a timer (6), and stores look-up requests received from the gateway in the data store, and decides that a message is likely to be unsolicited if a corresponding look-up request has not been received within a pre-set time period.

18 Claims, 4 Drawing Sheets

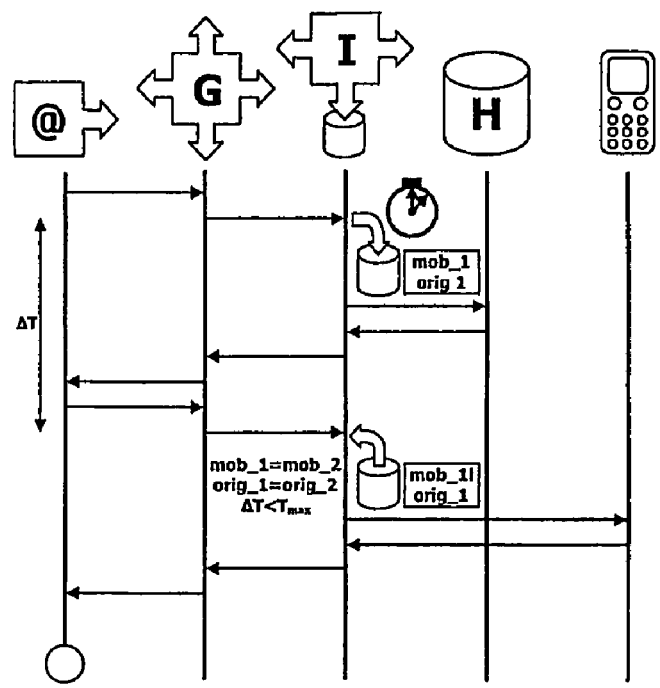
Valid Messaging Scenario          Fig. 3
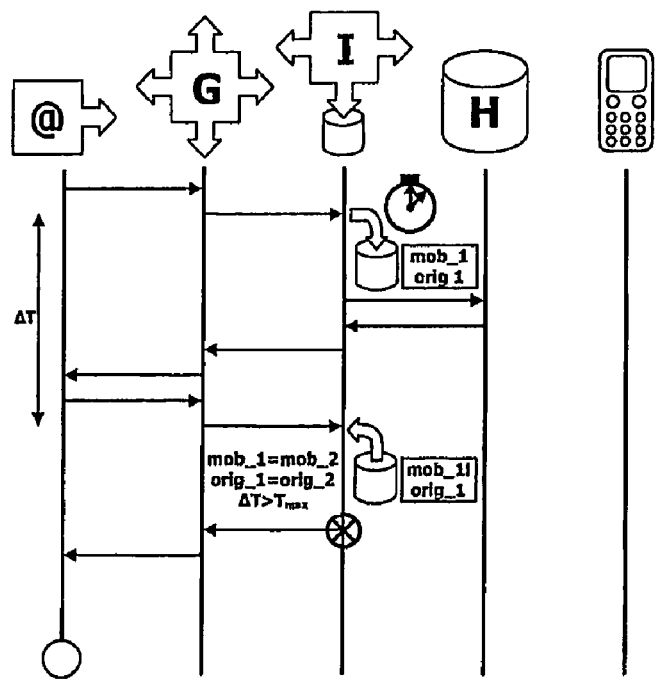
Invalid Messaging Scenario due to Timeout          Fig. 4

Invalid Messaging Scenario due to Invalid Source Identification

Invalid Messaging Scenario due to No Prior Lookup

MOBILE NETWORK SECURITY SYSTEM

This is a national stage of PCT/IE2006/000002 filed 18 Jan. 2006, claiming the benefit of U.S. Provisional Application No. 60/644,531 filed 19 Jan. 2005, and published in English.

FIELD OF THE INVENTION

The present invention relates to a security system for mobile networks and a method of providing increased security in mobile networks.

PRIOR ART DISCUSSION

As with electronic mail, unsolicited messages or spam messages are a problem in the mobile network environment. The content of these messages is usually aimed to push the recipient to make use of some charged services. Such messages are a source of irritation to the user and are often misleading.

Like e-mail spam, spam messages are becoming an increasing source of nuisance to mobile users. The content of these messages is usually aimed to push the recipient to make use of some charged services, such as calling a specific charged 0800 number. This phenomenon is irritating to the recipient who does not fall into the trap, and is also misleading as the end-user who did fall in the trap will eventually blame the operator. By using faked source addresses in their messages, spamming parties keep their identity hidden from operators.

The invention addresses the problem of unsolicited messages in mobile networks.

SUMMARY OF THE INVENTION

According to the invention, there is provided a security system for a mobile network having a gateway for receiving messages from outside the network and a network element storing mobile terminal location information, wherein the security system:
  monitors in real time messages entering the network through the gateway, and
  decides according to said monitoring if messages are likely to be unsolicited.

The invention also provides a method implemented by a security system for monitoring messages in a mobile network having a gateway for receiving messages from outside the network and a network element storing mobile terminal location information, the method comprising the steps of the security system:
  monitoring in real time messages entering the network through the gateway, and
  deciding according to said monitoring if messages are likely to be unsolicited.

In one embodiment, the system blocks messages which are likely to be unsolicited.

In another embodiment, the system also monitors data for a look-up request for a message, and decides according to said look-up request data and monitoring messages.

In another embodiment, the system monitors a source address of a look-up request and a source address of a corresponding message, and decides that the message is likely to be unsolicited if its source address is different from that of the corresponding look-up request.

In a further embodiment, the system further comprises a data store and a timer, the system stores look-up requests received from the gateway in the data store, and decides that a message is likely to be unsolicited if a corresponding look-up request has not been received within a pre-set time period.

In one embodiment, the system stores the look-up requests for only a pre-set time duration, and determines if a request has been received within said pre-set time period if it is stored in the data store when the data store is searched upon receipt of a message.

In another embodiment, the system determines that a look-up request corresponds with a message if they have the same source address.

In another embodiment, the system activates the timer upon receipt of said request.

In another embodiment, the timer is configured to run from the time of receipt $T_0$ to a preset time limit $T_{preset\_end}$.

In a further embodiment, the system facilitates setting the timer time limit $T_{preset\_end}$ for a category of look-up request.

DETAILED DESCRIPTION OF THE INVENTION

Brief Description of the Drawings

The invention will be more clearly understood from the following description of some embodiments thereof, given by way of example only with reference to the accompanying drawings in which:

FIGS. 3 to 6 are message transfer diagrams illustrating operation of the system in more detail.

DESCRIPTION OF THE EMBODIMENTS

Figure 1:
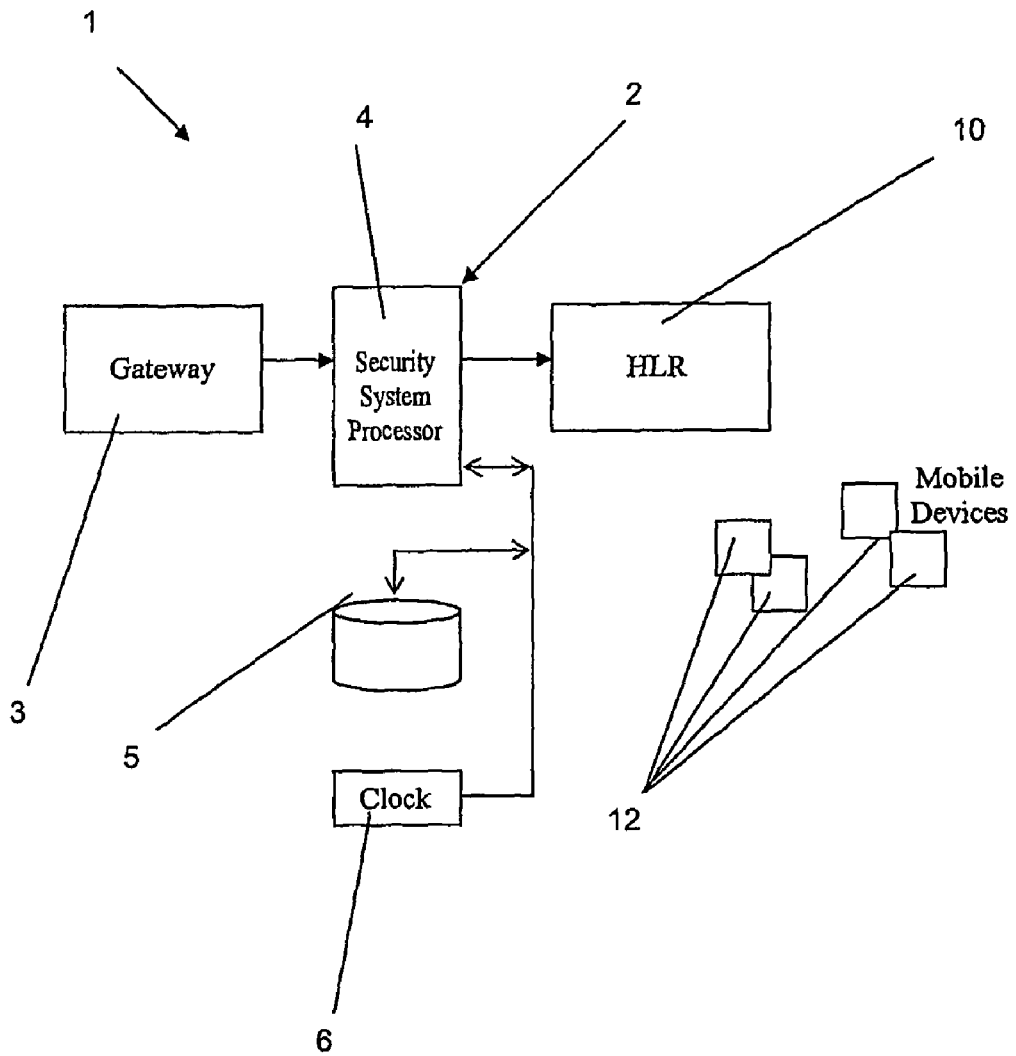
FIG. 1 is a block diagram illustrating the components of a system of the invention.

Referring to FIG. 1 a mobile network 1 comprises a security system 2 connected to a mobile network international gateway 3. The mobile network 1 comprises a HLR (Home Location Register) 10 and a plurality of user mobile devices 12. The locations of devices 12 serviced by an operator are maintained in the HLR 10. For every Mobile Terminated service that is requested from the network, a look up or Send Routing Information (SRI) request to the HLR 10 is required to obtain location information in order to successfully deliver the service, for example a subsequent message.

The security system 2 has a processor 4 programmed to monitor incoming SRI requests R1, R2 . . . Rn and incoming messages M1, M2 . . . Mn. The routing configuration within the mobile network 1 is such that all potentially suspicious messages are routed through the security system 2 where they can be analyzed. Incoming SRI requests include source information. Incoming messages M1, M2 . . . Mn are each associated with a prior SRI request. The security system 2 also comprises a local data store 5 and a timer clock 6. Received SRI requests are monitored, associated source information is copied to the local data store 5 and an associated counter of the timer clock 6 is started.

Some features typical of unsolicited messages or spam are as follows:
  The HLR is queried by SRI request once per MSISDN, independent of possible immediate subsequent MT-services, to find out where an end user mobile terminal M1 typically resides.
  The location information retrieved from the HLR query, in response to a look up request/SRI request, is then used in the time period T thereafter to submit unsolicited messages destined for the end-user.

Traffic enters a network via the international gateway and directly targets the recipient mobile terminal M1 without passing through any local service center (and hence bypasses local network filters).

A faked source address is used in the messages themselves (to prevent tracing the message back to the originating party).

As a result of the faked source address in the message, the acknowledgement related to the message will never reach the true originator. In contrast with regular trustworthy MT services, the outcome of the individual message deliveries is irrelevant to the originator as long as a significant percentage of deliveries is successful. The latter criterion is expected to be satisfied due to the prior SRI request revealing the typical locations of the target mobile stations M1, M2, ... Mn.

The system 1 and method of the invention operate to prevent messages with the above noted features from passing through. The method of operation involves monitoring SRI requests and incoming messages. As noted above the location information retrieved from the HLR query, in response to a look-up request/SRI request, is then used in the time period T thereafter to submit unsolicited messages destined for the end-user. The clock timer 6 is thus preset to run from the time of receipt of a SRI request $T_0$ to a preset time limit $T_{preset\_end}$. The timer value may be implemented on the basis of parameters, such as the location of the source of the SRI.

Figure 2:
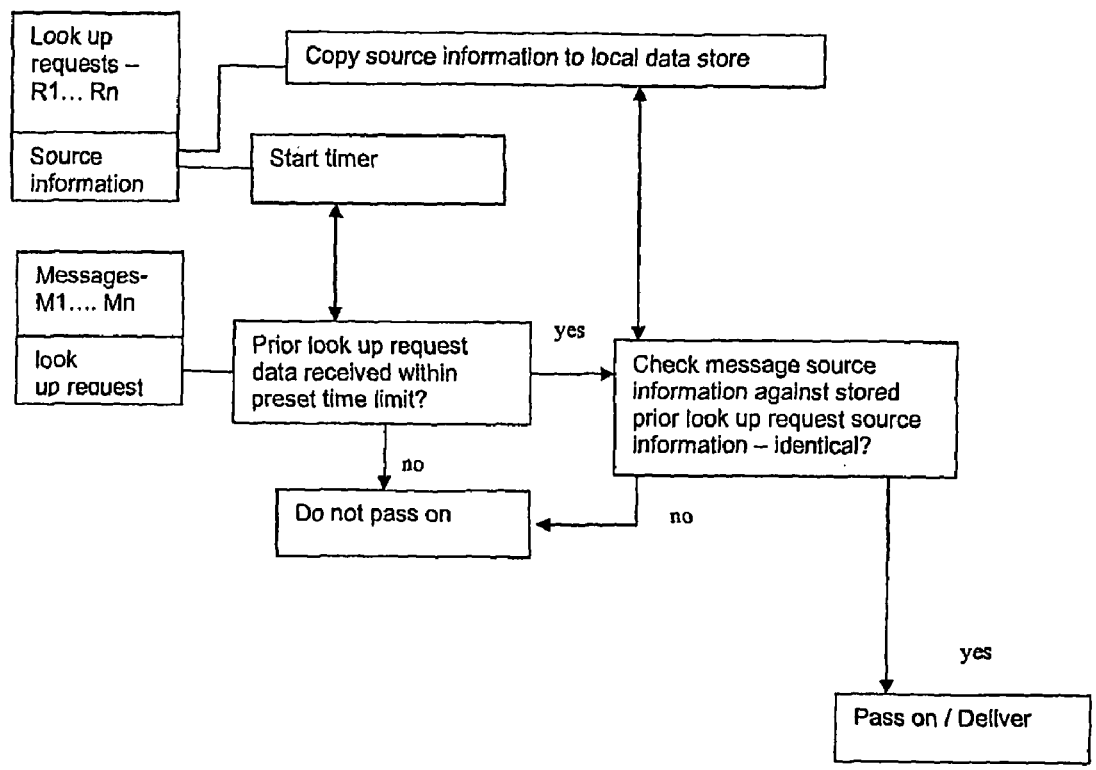
FIG. 2 is flow diagram illustrating the flow of data through the system of FIG. 1.
Figure 5:
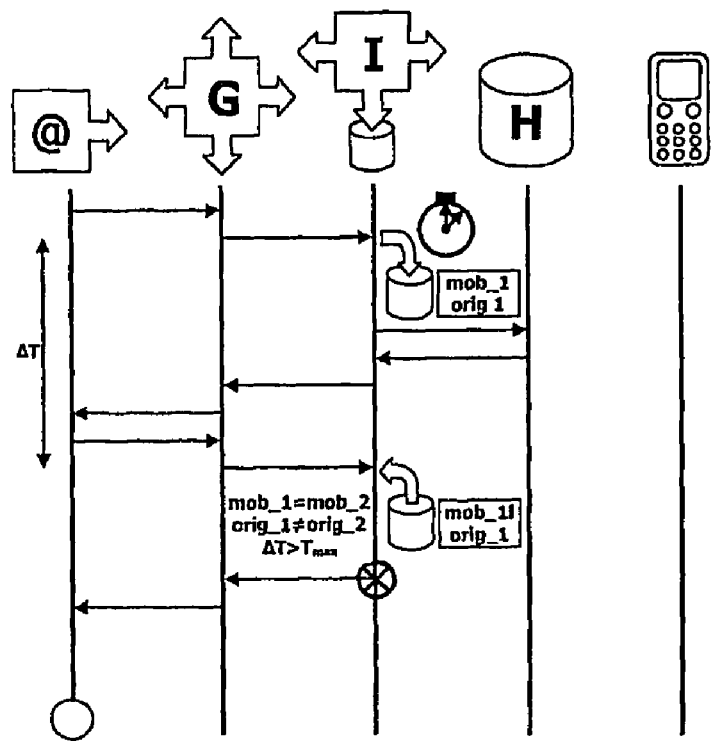
Figure 6:
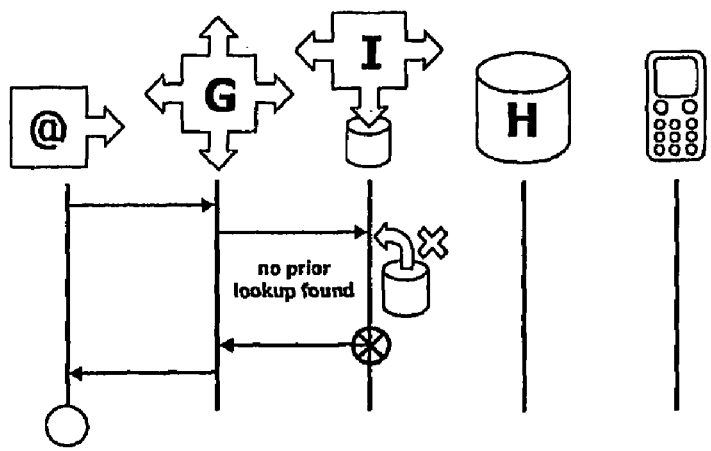

Referring to FIG. 2, the method performed by the security system 4 includes the following steps:

1. When a SRI request enters the network 1 through the international gateway 3:
   the request is passed on,
   a timer is started in the clock 6,
   relevant source information is copied to the local data store 5, including the originating address and the terminating mobile station address (MSISDN),
   if the timer expires without a subsequent message then the associated source information of the SRI request is removed from the local store or kept internally for tracing purposes.
2. A message entering the network is monitored and analyzed and action performed depending on the outcome of the analysis.
   If no prior SRI request was observed within the time limits set by the timer, then the message is not passed on and an acknowledgement is generated. Since the source address in the message itself is likely to be faked, the acknowledgement is expected not to reach back to the true originator and hence the choice between a positive or negative acknowledgement is an implementation-dependent choice of the operator. The system associates a message with a look-up request on the basis of the termination mobile station identification (MSISDN).
   If a prior SRI request was observed within the above time limit it is subjected to a further test in which the source information of the message is compared to the source information of the earlier location request.
   If the two source addresses are not identical then the message is not passed on. Again, according to operator-chosen settings a positive or negative acknowledgement may be sent back. The source address of the prior SRI request can be marked as suspicious and kept for further investigation as it is the true source of these unsolicited messages.
   If the two source addresses match, the message is passed on for delivery and the timer is restarted.

FIGS. 3-6 illustrate the dynamics of operation of the system in more detail. The "@"-component refers to an external entity/message source, the "G"-component is the gateway through which the message/SRI enters the local network, the "I"-component is the system of the invention, the "H"-component is the local HLR which contains the locations of all mobile devices in the network, and finally the mobile pictogram refers to the mobile devices themselves.

The (internal) architecture of the security system includes a proxy which is able to look into the relevant details of a passing message/SRI request and a data store for keeping relevant data related to (recent) SRI requests so that these details can be compared to those of subsequent messages.

In case an SRI enters, at least the following information is stored: source address of the originator of the SRI, identification of the mobile for which the query is intended, and the current time. As soon as a message itself is received then the recipient address of that message is used to perform a lookup in the store. In case one (or more) registration of a prior SRI is found then the source address of that SRI is compared to that of the message itself. If no prior SRI is found (FIG. 6), if no matching source address is found (FIG. 5) or if the time between the SRI and the message itself is larger than some configurable value (FIG. 4) then the message is not let through. Else, the message is delivered normally (FIG. 3).

The system of the invention enables real time monitoring and control of unsolicited messages arriving in a mobile network. This method prevents mobile users from receiving untraceable messages with fake source addresses from an international source by monitoring and controlling international traffic as described above.

The method of the invention serves to prevent unsolicited messages from passing through mobile networks. It has the advantage that traceability is guaranteed and that end users are not bothered by these messages.

The invention also includes a computer readable medium comprising software code for performing the method as described above when executing on a digital data processor.

The invention is not limited to the embodiments described but may be varied in construction and detail.

The invention claimed is:

1. A security system for a mobile network having a gateway for receiving messages from outside the network and a network element storing mobile terminal location information, comprising a processor wherein the security system is adapted to:
   monitor by the processor in real time look-up requests made to said network element and entering the network through the gateway,
   monitor by the processor in real time a message entering the network through the gateway and its correspondence to said look-up requests; and
   decide by the processor that said message is likely to be unsolicited, and
   wherein the system further comprises a data store device and a timer device,
   wherein the system processor is adapted to store in the data store device look-up request information obtained from said look-up requests received from the gateway,
   wherein, when a message is received, the system processor is adapted to use said timer device to decide that said message is likely to be unsolicited if a prior look-up request corresponding to said message had not been received within a pre-set time period; and
   wherein the system processor is adapted to monitor in said look-up request information obtained from said look-up requests a source address of a look-up request and to monitor a source address of said message, and to decide that the message is likely to be unsolicited if the message source address is different from the corresponding look-up request source address.

2. The system as claimed in claim 1, wherein the system is adapted to store the look-up request information in the data store device for only a pre-set time duration, and to determine when the data store device is searched upon receipt of a message if a corresponding prior look-up request has been received within said pre-set time period if information concerning such a look-up request is stored in the data store device.

3. The system as claimed in claim 1 wherein the system is adapted to activate the timer device upon receipt of a look-up request.

4. The system as claimed in claim 3, wherein the timer device is configured to run from the time of receipt $T_0$ to a preset time limit $T_{preset\_end}$.

5. The system as claimed in claim 1, wherein the system is adapted to facilitate setting the timer device time limit $T_{preset\_end}$ for a category of look-up request.

6. The system as claimed in claim 1, wherein the system is adapted to block messages which are likely to be unsolicited.

7. The system as claimed in claim 1, wherein the system is configurable to send a positive or a negative acknowledgement according to the monitoring.

8. The system as claimed in claim 1, wherein the system is adapted to mark as suspicious and keep for further investigation a source address of a look-up request corresponding to a message likely to be unsolicited.

9. A method implemented by a security system for monitoring messages in a mobile network having a gateway for receiving messages from outside the network and a network element storing mobile terminal location information, comprising a processor, the method comprising the steps of the security system:
    monitoring by the processor in real time look-up requests made to said network element and entering the network through the gateway;
    monitoring by the processor in real time a message entering the network through the gateway and its correspondence to said look-up requests; and
    deciding by the processor that said message is likely to be unsolicited, and
    wherein, the system stores a look-up request information obtained from said look-up requests received from the gateway in a data store device, wherein, when a message is received, the processor uses said timer device to decide that a message is likely to be unsolicited if a corresponding prior look-up request corresponding to said request had not been received within a pre-set time period; and
    wherein the system processor is adapted to monitor in said look-up request information obtained from said look-up requests a source address of a look-up request and to monitor a source address of said message, and to decide that the message is likely to be unsolicited if the message source address is different from the corresponding look-up request source address.

10. The method as claimed in claim 9, wherein the system monitors a source address of a look-up request and a source address of a corresponding message, and decides that the message is likely to be unsolicited if its source address is different from that of the corresponding look-up request.

11. The method as claimed in claim 9, wherein the system stores the look-up request information in the data store device for only a pre-set time duration, and determines when the data store device is searched upon receipt of a message if a corresponding prior look-up request has been received within said pre-set time period if information concerning such a look-up request is stored in the data store device.

12. The method as claimed in claim 9 wherein the system activates a timer device upon receipt of a look-up request.

13. The method as claimed in claim 12, wherein the timer device runs from the time of receipt $T_0$ to a preset time limit $T_{present\_end}$.

14. The method as claimed in claim 9, wherein the time limit $T_{preset\_end}$ is set for a category of look-up request.

15. The method as claimed in claim 9, wherein the system blocks messages which are likely to be unsolicited.

16. The method as claimed in claim 9, comprising the further step of sending a positive or a negative acknowledgement according to the monitoring.

17. The system as claimed in claim 9, wherein the system marks as suspicious and keeps for further investigation a source address of a look-up request corresponding to a message likely to be unsolicited.

18. A non-transitory computer readable medium comprising software code for performing a method when executing on a digital data processor of a security system, the method being for monitoring messages in a mobile network having a gateway for receiving messages from outside the network and a network element storing mobile terminal location information, and the method comprising the steps of:
    monitoring by the processor in real time look-up requests made to said network element and entering the network through the gateway;
    monitoring by the processor in real time a message entering the network through the gateway and its correspondence to said look-up requests; and
    deciding by the processor that said message is likely to be unsolicited;
    wherein the system further comprises a data store device and a timer device,
    wherein the system processor is adapted to store in the data store device look-up request information obtained from said look-up requests received from the gateway,
    wherein, when a message is received, the system processor is adapted to use said timer device to decide that said message is likely to be unsolicited if a prior look-up request corresponding to said message had not been received within a pre-set time period; and
    wherein the system processor is adapted to monitor in said look-up request information obtained from said look-up requests a source address of a look-up request and to monitor a source address of said message, and to decide that the message is likely to be unsolicited if the message source address is different from the corresponding look-up request source address.

* * * * *